March 20, 1945.  F. W. LEE  2,371,629

MEANS FOR PRODUCING ARTIFICIAL THERMALS

Filed July 24, 1943

INVENTOR
FREDERICK W. LEE
BY
ATTORNEY

Patented Mar. 20, 1945

2,371,629

UNITED STATES PATENT OFFICE 2,371,629

MEANS FOR PRODUCING ARTIFICIAL THERMALS

Frederick W. Lee, Owings Mills, Md., assignor to the Government of The United States, as represented by the Secretary of the Interior Application July 24, 1943, Serial No. 495,997

3 Claims. (Cl. 126—270)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to a means for forming an artificial thermal or ascending warm air current, and more particularly to artificial thermals for sail-plane soaring.

Heretofore, gliders and other sail-planes have been sustained in flight by uprising currents of air created either by the general hilly character of the terrain or earth structure below the glider, or in some cases created as the result of an ascending warm air current or thermal, which, in rising, carries the glider to a sufficient altitude so that it may thereafter soar to another location having an uprising air current. The present invention is based on the observation that a black body, positioned below the sail-plane and heated by solar radiation or other means, warms the air adjacent to the black body, causing it to rise, thus forming an ascending convection current of warm air known as a "thermal."

It is an object of this invention to provide means for forming artificial thermals or ascending warm air currents. Another object is to provide a device actuated by solar radiation which forms artificial thermals of desired characteristics. Yet another object is to provide artificial thermals having a rotary or vortex-like character. Still another object is to provide a simple and inexpensive device for creating artificial thermals which can be installed at an air field or other location and which will provide an ascending air current or thermal adapted to sustain gliders or other sail-planes in flight.

In accordance with the present invention, an artificial thermal is created by passing atmospheric air over a black body heated by solar radiation or other means, whereby the air is warmed, and rises, and thereafter accelerating the upward movement of the formed warm ascending air current.

When a glider, airplane or other sail-plane passes over a heated black body, as embodied in the device of the present invention, the ascending air current imparts an upward velocity to the sail-plane which carries it to a substantially higher altitude or permits it to carry an increased load. Desirably, one or more devices embodying the present invention are positioned on or around a sail-plane field.

The atmospheric air at ordinary temperatures is conducted by means later to be described over the heated black body, where it is elevated in temperature. The heated air expands and ascends, thus creating an ascending convection current. Positively accelerating the upwardly moving air current, such as by means hereinafter described, very greatly improves the characteristics of the ascending air current or thermal, and results in a very efficient utilization of the black body such that solar radiation alone is a sufficient heating means. However, positive acceleration of the ascending air current is also beneficial when the black body is heated by other means.

The invention thus comprises the means for creating artificial thermals as above and hereafter described, and the combination of parts and relationships thereof, the particular features and advantages of which will be made clear by reference to the ensuing description and accompanying drawing in which.

As is well-known to physicists, a perfect "black body" is one which radiates all incident heat, but in this invention, a body which has a dull, non-reflecting coating and which is black in color will act as a black body with only a small loss in efficiency. For the purposes of the present invention, the black body chosen preferably comprises a heat-collecting layer of asphalt, pitch, bitumen, or other dull, non-reflecting black material, and a heat-insulating layer spaced apart from and below the layer of heat-collecting material, the space between said collecting and insulating layers containing a heat-storing substance. The heat-insulating layer may be made of numerous heat-insulating materials, such as cork, cotton, and the like, but is preferably made of mineral wool or glass wool.

The heat-storing layer is made of the known materials having a high specific heat, such as soap-stone bricks, magnesite bricks, or other refractory material.

Figure 1:
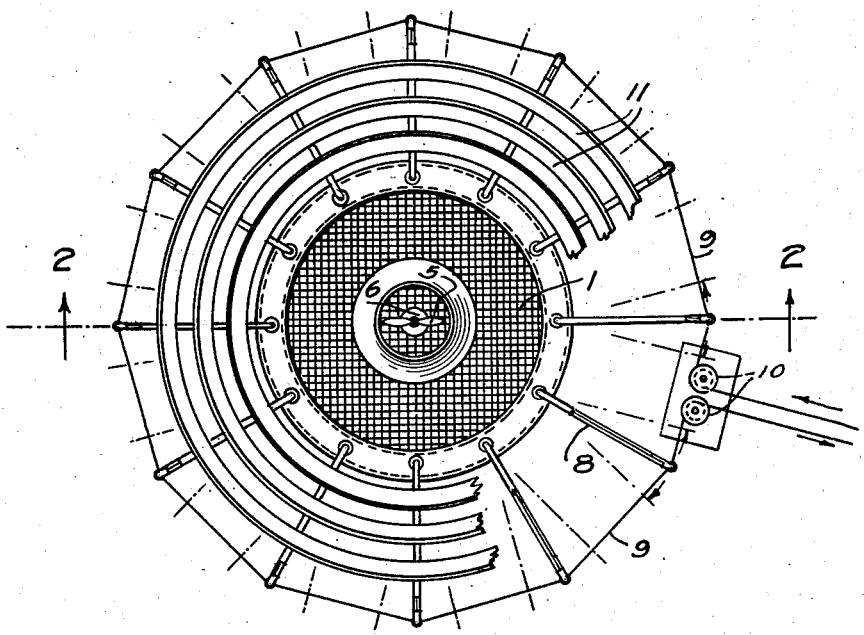
Figure 1 is a plan view of the device in accordance with the present invention.
Figure 2:
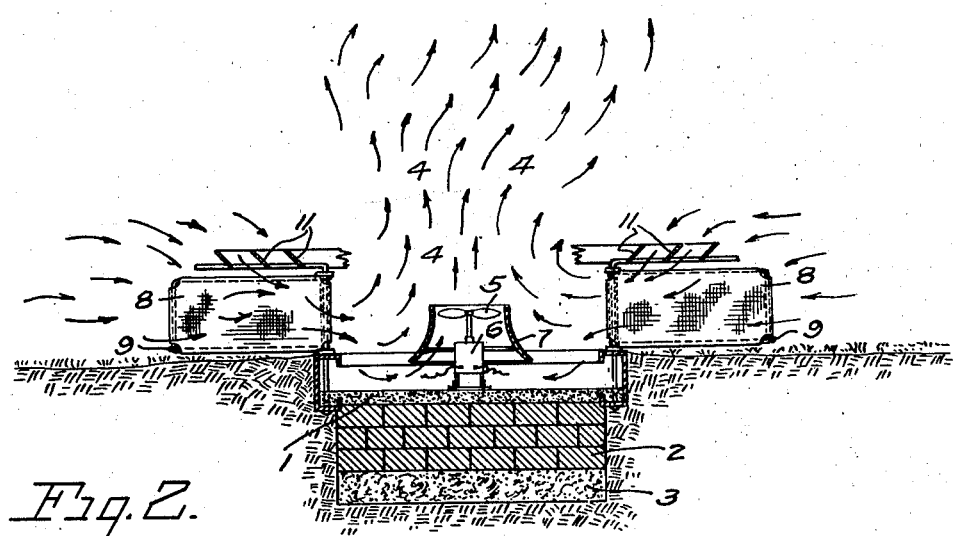
Figure 2 is a sectional view of the device illustrated in Figure 1, this section being along the line 2—2 of Figure 1.

In the drawing, and referring now to Figure 2, the heat-collecting layer 1 of the black body is preferably positioned a short distance, say about one foot, below the surface of the earth or otherwise shielded from surface air currents. Directly beneath the heat-collecting layer 1 is the heat storing layer 2 mounted in turn upon the heat-insulating layer 3. The three layers 1, 2 and 3 forming the black body are of any convenient shape, but preferably are made in a generally cylindrical shape in which the diameter of the cylinder is largely in excess of the depth. Mounted directly above the heat-collecting layer 1 is a fan or other means for accelerating air currents, having the blades fixed in such a manner that upon actuation thereof air currents 4 are given an upward impulse. The fan 5 is actuated by a motor 6, preferably electrically driven. It is desirable, although not essential, that the fan be enclosed in a wind tunnel 7 of generally annular shape. Surrounding the black body and fan are a series of vertically positioned guides 8 which direct the incoming air currents over the black body. The guides 8 are pivoted at the ends thereof next adjacent the black body, the opposite ends being free for adjustment purposes. The free ends can be attached to a rope or other flexible leader 9, the ends of which are passed through pulleys 10 and can be manually adjusted to cause the guides 8 to impart a tangential direction to incoming air currents. By this means the uprising air currents 4 have an angular velocity imparted to them to impart a rotary or vortex-like form to the resulting artificial thermal. It is well-known that an artificial thermal having a rotary or vortex-like character is much more resistant to rupture by atmospheric disturbances, and will, therefore, maintain its form to a much higher altitude. Surmounting the guides 8 and movably attached thereto are a series of annular vanes 11 which are slightly flared away from the black body and which smoothly direct incoming air currents into the guides 8 without the formation of undesired eddy currents.

In operation, the black body with its heat-collecting surface 1 is preferably of such a diameter as to permit the formation of an artificial thermal having a substantial size, the black body for this purpose being of a diameter of at least six feet, and preferably not larger than approximately fifty feet. Smaller or larger black bodies can be employed if desired, but the efficiency of the larger sizes may be somewhat reduced, and the thermal created by a smaller size will be substantially weakened. In operation, the surface air is directed through the guides 8 over the black body and its heat-collecting layer 1 where it is heated by solar radiation. The heated air current rises and is accelerated upwardly by the fan 5. A glider or other sail-plane is launched near the device, and as it crosses the artificial thermal produced, is carried by the uprising air current to a substantially higher altitude than it previously had. Around a sail-plane field a number of the thermal producing devices can be spaced so that a large number of uprising air currents are created and the sail-plane can hover over the field for an indefinite length of time, depending upon the amount of solar radiation. The heat-storing layer 2 of the device of the present invention permits the artificial thermal to be maintained for protracted periods after the sun no longer provides sufficient radiation to actuate the device. Preferably, the ground surrounding the device of the present invention is planted in grass or covered with other material which maintains a low temperature, such as by flooding with water.

Although the device of the present invention has been particularly described with reference to use for glider purposes, it is obvious that power-operated sail-planes can likewise be materially aided in taking off from air fields when the present invention is employed adjacent the take-off area. For example, a heavily loaded plane may be assisted in clearing obstructions and the like by the ascending air current or artificial thermal created in accordance with the present invention. Balloon and dirigible ascensions can be greatly facilitated by artificial thermals created in accordance with the present invention.

From the foregoing, it is apparent that simple and efficient means have been provided for creating artificial thermals for sail-plane use. While the invention is of greatest utility when the black body is heated by solar radiation, it is within the scope of the present invention to provide artificial heating means, such as a combustion chamber within or below the black body and thereby to dispense with solar radiation. Obviously, the device may be actuated by a combination of solar radiation with artificial heating means.

Since many apparently widely different embodiments can be made, it is obvious that various changes can be made in the invention without departing from the spirit and scope thereof.

What is claimed is:

1. Apparatus for forming artificial thermals for sail-plane use which comprises in combination a black body positioned to permit solar rays to impinge thereon and adapted to be heated by said solar rays and in turn to heat the adjacent atmosphere, thereby causing it to ascend, vertically positioned adjustable guide means adjacent said black body, adapted to direct incoming atmospheric air over said black body in a tangential direction, annular guide means positioned above said vertical guide means and adapted to smoothly direct incoming air into said vertical guide means, and means positioned directly over the central portion of said black body for accelerating the formed ascending air current or thermal, whereby in operation an artificial thermal having an angular momentum is produced.

2. Apparatus for forming artificial thermals for sail-plane use which comprises in combination a black body positioned to permit solar rays to impinge thereon to heat said body and in turn to heat adjacent atmosphere thereby causing it to ascend, vertically positioned adjustable guide means pivotally mounted adjacent the periphery of said body for imparting an angular momentum to said ascending air current or thermal, and electrically-actuated means over said body in relation thereto for accelerating the formed ascending air current or thermal.

3. In apparatus for forming artificial thermals for sail-plane use, the combination of a black body adapted to be positioned in the earth and having a horizontal blackened surface exposed to solar radiation adapted to be positioned below the surrounding earth surface, adjustable guide means pivotally mounted closely adjacent said body for directing incoming air tangentially over said body, and a fan over said body in relation thereto for accelerating upwardly the formed ascending air current or thermal.

FREDERICK W. LEE.